United States Patent [19]

Okada

[11] Patent Number: 4,914,907
[45] Date of Patent: Apr. 10, 1990

[54] AXLE DRIVING APPARATUS

[75] Inventor: Hideaki Okada, Takarazuka, Japan

[73] Assignee: Kanzaki Kokyukoki Mgf. Co. Ltd., Japan

[21] Appl. No.: 304,582

[22] Filed: Feb. 1, 1989

[30] Foreign Application Priority Data

Feb. 3, 1988 [JP] Japan .................................. 63-24193
Mar. 9, 1988 [JP] Japan .................................. 63-55828

[51] Int. Cl.[4] .............................................. F16D 39/00
[52] U.S. Cl. .......................................... 60/487; 91/505; 180/53.1; 180/307
[58] Field of Search ................. 60/464, 494, 487, 453, 60/454, 484, 485; 91/505; 180/305, 307, 53.1, 53.4

[56] References Cited

U.S. PATENT DOCUMENTS

| | | | |
|---|---|---|---|
| 2,945,382 | 7/1960 | Ritter et al. | .......................... 180/53.4 |
| 3,270,826 | 9/1966 | Middlesworth et al. | ....... 180/305 X |
| 3,430,438 | 3/1969 | Weiss . | |
| 3,687,212 | 8/1972 | Forster . | |
| 3,902,567 | 9/1975 | Pekar, Jr. | ............... 180/305 |
| 3,944,010 | 3/1976 | Winter et al. . | |
| 4,145,883 | 3/1979 | Forster | ............... 60/490 X |
| 4,627,237 | 12/1986 | Hutson . | |
| 4,781,259 | 11/1988 | Yamaok et al. | .................. 180/305 X |

FOREIGN PATENT DOCUMENTS 3239223 10/1982 Fed. Rep. of Germany .

Primary Examiner—Edward K. Look
Attorney, Agent, or Firm—Saidman, Sterne, Kessler & Goldstein

[57] ABSTRACT

An axle driving apparatus, in which a transmission casing thereof is vertically divided into an upper half casing and a lower half casing, the butt joint surfaces therebetween are used as bearing surfaces for axles, a motor shaft and a counter shaft, a center section is disposed in the transmission casing, a hydraulic pump is attached to the center section vertically thereof, a hydraulic motor is attached to the same horizontally thereof, and an HST system transmission, first and second deceleration units and differential gears, are tight enclosed in the transmission casing.

5 Claims, 9 Drawing Sheets

AXLE DRIVING APPARATUS

FIELD OF THE INVENTION

The present invention relates to an axle driving apparatus with a hydro-static-transmission used as a driving apparatus for a light tractor.

Description of the Prior Art

An axle driving apparatus has hitherto been well known which divides casing for the axle driving apparatus into upper and lower portions and journals axles at the divided surface so as to drive the axles by a hydro-static-transmission attached to the casing and which is disclosed in, for example, the Japanese Utility Model Publication Gazette No. Sho 62-44198 and Japanese Patent Laid-Open Gazette No. Sho 62-101945.

In the prior art, however, the HST system transmission quite separate from the axle driving apparatus is exposed at the outside of a casing thereof, whereby the apparatus is large-sized as a whole and larger in the gross weight. Also, it is required for driving a horizontally disposed axles by a motor shaft of a hydraulic motor disposed vertically at the exterior to interpose a bevel gear unit between both the driving system.

SUMMARY OF THE INVENTION

An object of the invention is to provide an axle driving apparatus, which is so constructed that a transmission case is vertically divided into an upper half casing and a lower half casing, the matching surfaces on both the casings are formed into bearing faces, and within the transmission casing are disposed a hydro-static-transmission, a first deceleration means, a second deceleration means, and differential gears.

A hydraulic pump is vertically disposed, the hydraulic motor is horizontally disposed, and a center section for fixing both the hydraulic pump and hydraulic motor is provided so that a pump shaft and a motor shaft are supported at one ends thereof to the center section and at the other ends to the transmission casing.

The above and further objects and novel features of the invention will more fully appear from the following detailed description when the same is read in connection with the accompanying drawings.

DESCRIPTION OF THE PREFERRED EMBODIMENTS

Figure 1:
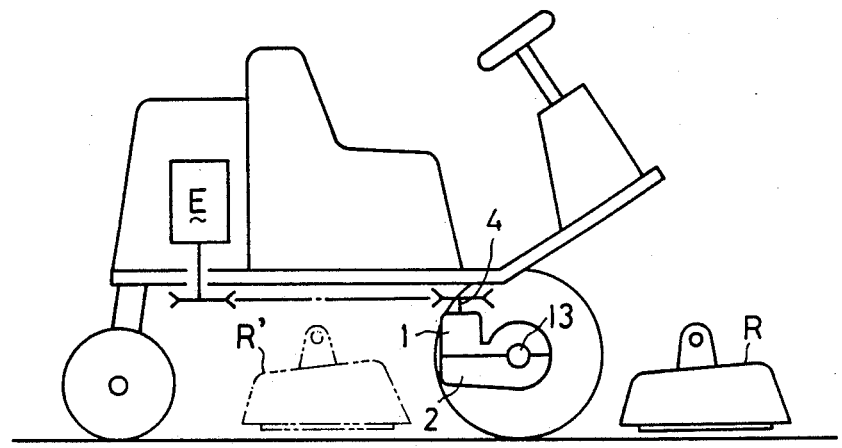
FIG. 1 is a side view of a light tractor provided with an axle driving apparatus of the invention.

Referring to FIG. 1, a light tractor loading thereon an engine E of a vertical crank shaft is shown.

A pulley is fixed to the vertical crank shaft of the engine so that a driving power is transmitted from the pulley through a belt to a pulley fixed to a pump shaft 4 of a hydraulic pump P projecting upwardly from an axle driving apparatus of the invention.

The tractor is provided at the front or under the body with a mower R or R' to thereby mow a lawn.

The present invention relates to the axle driving apparatus for driving axles 13 at the tractor.

Next, the axle driving apparatus will be detailed of its construction in accordance with FIGS. 1 through 6.

A transmission casing of the axle driving apparatus is formed in upper and lower half casings 1 and 2, both the casings being jointed to form one closed-type transmission casing.

Between the butt joint surfaces of the upper and lower half casings 1 and 2 are held bearings to the axles 13 and a counter shaft 24 and a bearing 34 for one end of a motor shaft 5.

At the lower surface of the upper half casing 1 is formed a mounting surface so that a center section 3 fixedly supporting the hydraulic pump P and a hydraulic motor M is mountable to the mounting surface through bolts 39 inserted into bolt holes 3g from below.

In the state where the center section 3 fixing thereto the hydraulic motor M and hydraulic pump P is mounted to the lower surface of the upper half casing 1, the lower half casing 2 is jointed from below with the lower surface of the upper half casing 1 in a manner of closing the lower half casing 2 and bolts are used to connect both the upper and lower half casings 1 and 2.

The upper and lower half casings 1 and 2 are formed by aluminum die casting, whereby parts subjected to mechanical processing are reduced to lower the manufacturing cost.

The HST type transmission stored within the axle driving apparatus comprises the hydraulic pump P, center section 3 and hydraulic motor M, so that a pump mounting surface 3d and a motor mounting surface 3e are formed in the plane perpendicular to the center section 3.

Pairs of crescent-shaped oil passages 3a' and 3b' and 3a" and 3b" are formed at the pump mounting surface 3d and motor mounting surface 3e, the pair of crescent-shaped oil passages 3a" and 3b" at the motor mounting surface 3e and pair of crescent-shaped oil passages 3a' and 3b' at the pump mounting surface 3d being connected to two oil passages 3a and 3b to constitute a closed circuit.

A cylinder block 10 for the hydraulic pump P is rotatably mounted on the pump mounting surface 3d and pistons 12 are inserted vertically slidably into a plurality of piston holes at the cylinder block 10 respectively.

When the pump shaft 4 supported by a bearing 31 at the upper half casing 1 and a spherical bush 32 at the pump mounting surface 3d is rotated, the cylinder block 10 and pistons 12 rotate.

A thrust bearing 15 abutting against the upper end of each piston is changed at an angle by a swash plate 9, so that the discharge rate and discharge direction of the hydraulic pump P are changed to supply the discharged pressure oil from the oil passages 3a' and 3b' at the center section 3 to the hydraulic motor M through the oil passages 3a and 3b.

Figure 4:
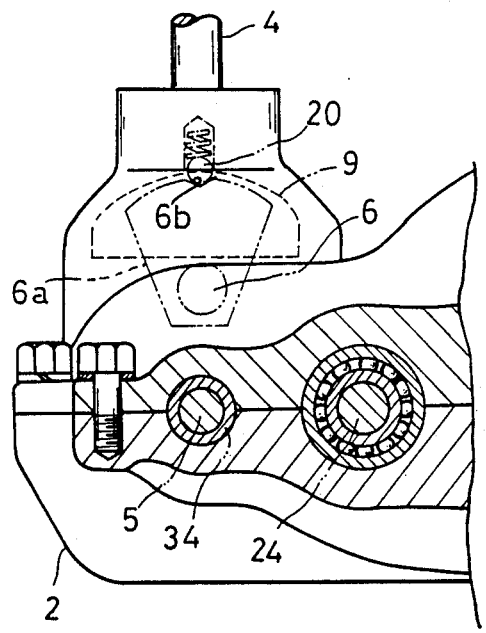
FIG. 4 is a sectional view taken on the line V—V in FIG. 3.
Figure 5:
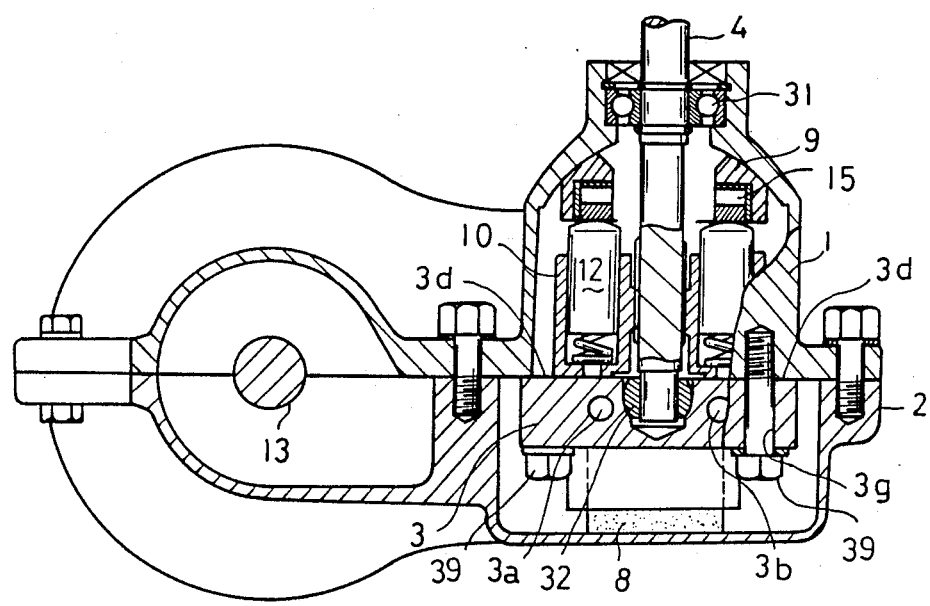
FIG. 5 is a sectional view taken on the line VI—VI in FIG. 3.

As shown in FIG. 4, the swash plate 9 is changeable of its angle through a positioning plate 6a in association with rotation of a speed change lever shaft 6, a detent unit 20 for holding the neutral position of the speed change lever shaft 6 being constituted in the upper half casing 1.

The detent unit 20 is fitted into a recess 6b at the positioning plate 6a, thereby enabling the neutral position to be ensured.

Figure 2:
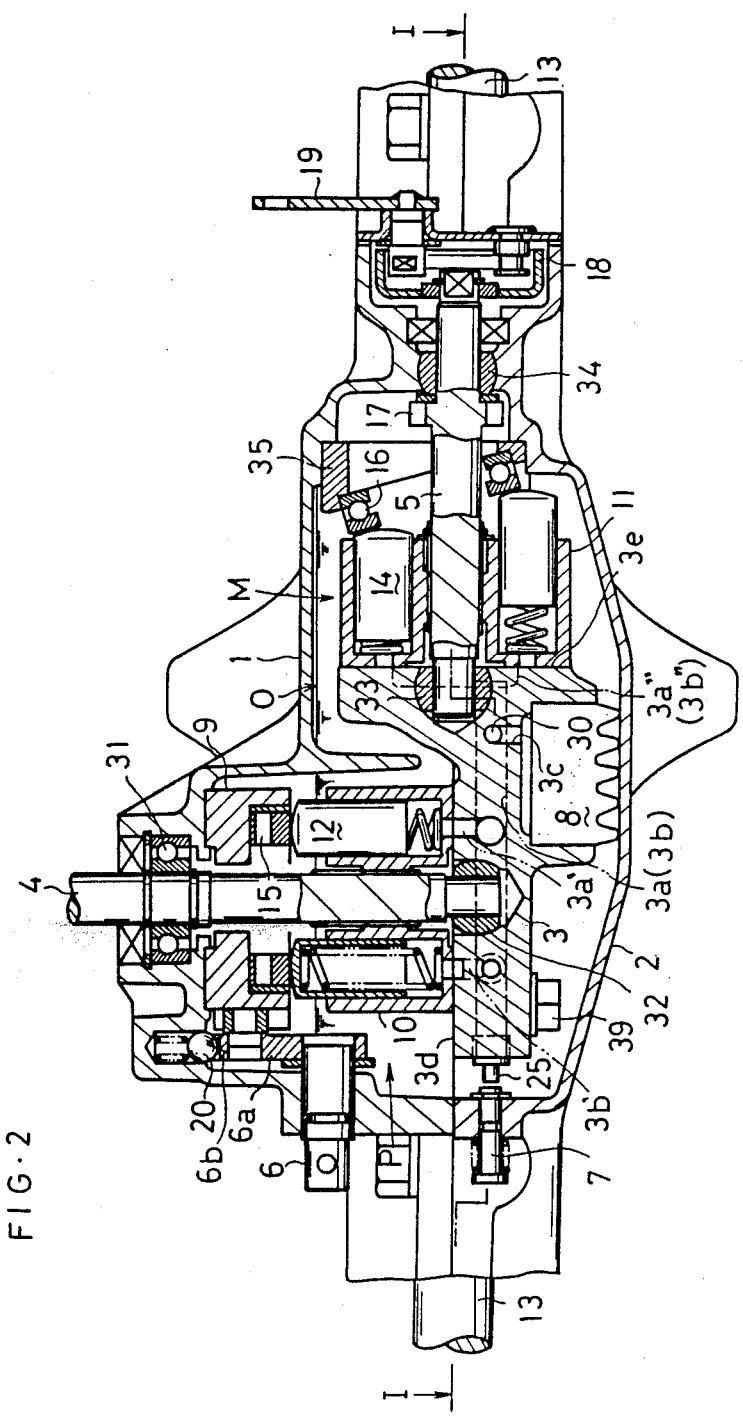
FIG. 2 is a sectional front view thereof.
Figure 3:
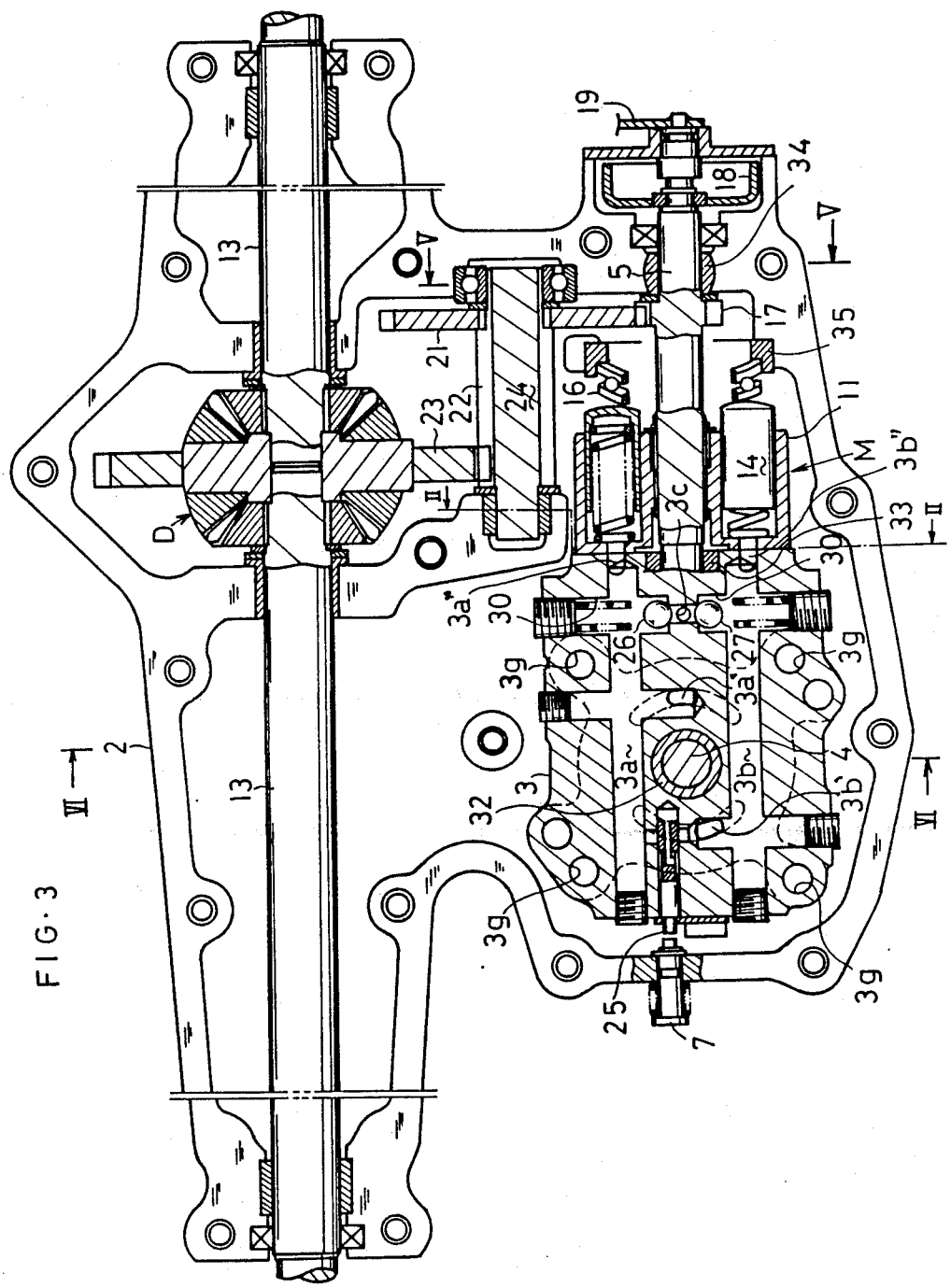
FIG. 3 is a sectional view taken on the line I—I in FIG. 2, showing the state where an upper half casing is removed from the FIG. 1 embodiment.

As shown in FIGS. 2 and 3, a short-circuit valve 25 of slidable selector valve for short-circuiting between the two oil passages 3a and 3b at the discharge side and the return side is disposed, so that when the valve 25 is changed over to haul the body of tractor, generation of the state where the hydraulic motor M side is driven to send the pressure oil toward the hydraulic pump side can be avoided.

Reference numeral 7 designates a control for operating the short-circuit valve 25.

The short-circuit valve 25 and control 7 are slidably operated to push to be disengageable or pull without engagement in order to be controllable in the abutting condition. Such construction enables simple assembly of the apparatus.

Between the oil passages 3a and 3b at the center section 3 are interposed check valves 26 and 27 to form an oil feed route 30, and between the check valves 26 and 27 is bored an operating oil suction port 3c extending downwardly.

In the lower end of operating oil suction port 3c is fitted an oil filter 8 formed of a spongy fine-porous material, the oil filter 8 contacting with the lower half casing 2 so as to be held thereto.

Thus, the oil filter 8, operating oil suction port 3c and check valves 26 and 27 are provided to communicate with the oil passages 3a and 3b through the check valves 26 and 27, whereby in a case where the hydraulic motor M and hydraulic pump P operate and the operating oil leaks from the interior of the closed circuit so as to decrease, the oil passage 3a or 3b generates therein negative pressure so that lubricating oil in the casing is taken in as the operating oil.

In addition, reference numeral 0 designates an oil level of lubricating oil filled into the transmission casing.

The pump mounting surface 3d at the center section 3 is somewhat larger in its flat surface to also serve as the surface through which the center section 3 is mounted to the lower surface of the upper half casing 1.

A cylinder block 11 is rotatably mounted onto the motor mounting surface 3e at the center section 3, and pistons 14 are slidably fitted into a plurality of piston holes at the cylinder block 11 and always abut at the heads against a thrust bearing 16. In such construction, the pistons 14 push the thrust bearing 16 through the pressure oil from the oil passages 3a and 3b and slide down at the heads along the slanted surface of the thrust bearing so as to generate a torque, thereby rotating the cylinder block 11 and motor shaft 5.

The thrust bearing 16 is supported by an annular support 35 in relation of being slanted at a predetermined angle, the annular support 35 being fixedly sandwiched between the upper and lower half casings 1 and 2.

The motor shaft 5 is provided at one axial end journalled to the center section 3 with a spherical bush 33 and at the other end with a spherical bush 34, which are sandwiched between the upper and lower half casings 1 and 2.

A gear 17 is mounted on the motor shaft 5 and engages with a gear 21 on the counter shaft 24, the gears 17 and 21 constituting the first deceleration means.

A small diameter gear 22 on the counter shaft 24 engages with a ring gear 23 at a differential gear unit D, which gives differential rotations to drive the axles 13.

The small diameter gear 22 and ring gear 23 constitute the second deceleration means.

A brake drum 18 is fixed to the foremost end of the motor shaft 5 and brake shoes are expanded radially outwardly by a brake lever 19 to contact with the brake drum 18, thereby exerting the braking action.

Figure 6:
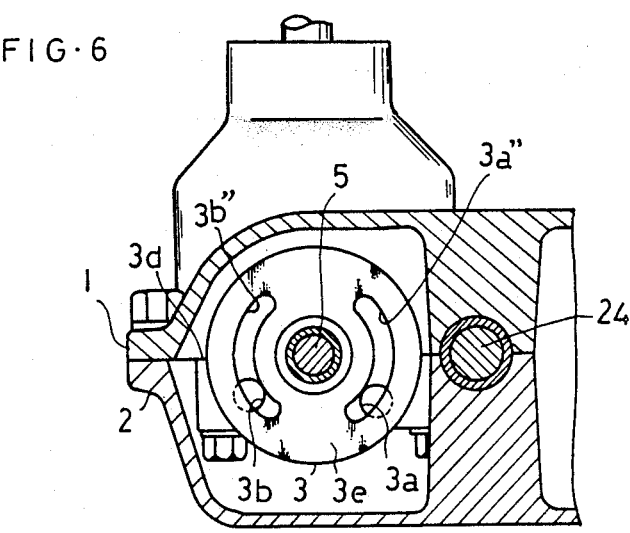
FIG. 6 is a sectional view taken on the line II—II in FIG. 3.
Figure 7:
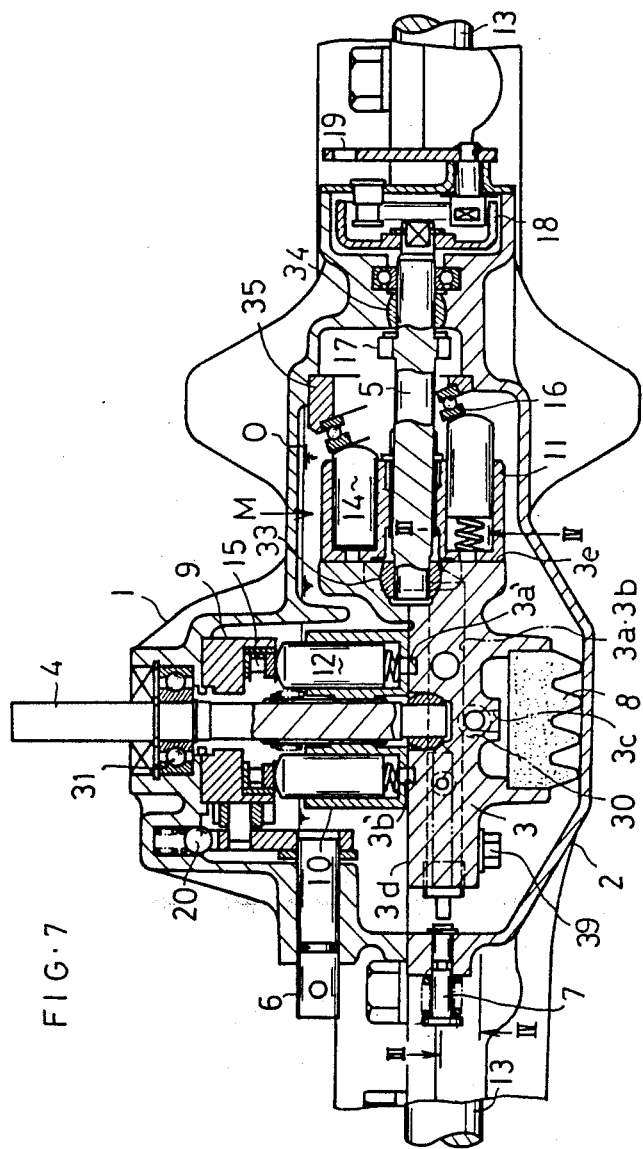
FIG. 7 is a sectional front view of a modified embodiment of the invention, in which check valves 26 and 27 are different in arrangement.
Figure 8:
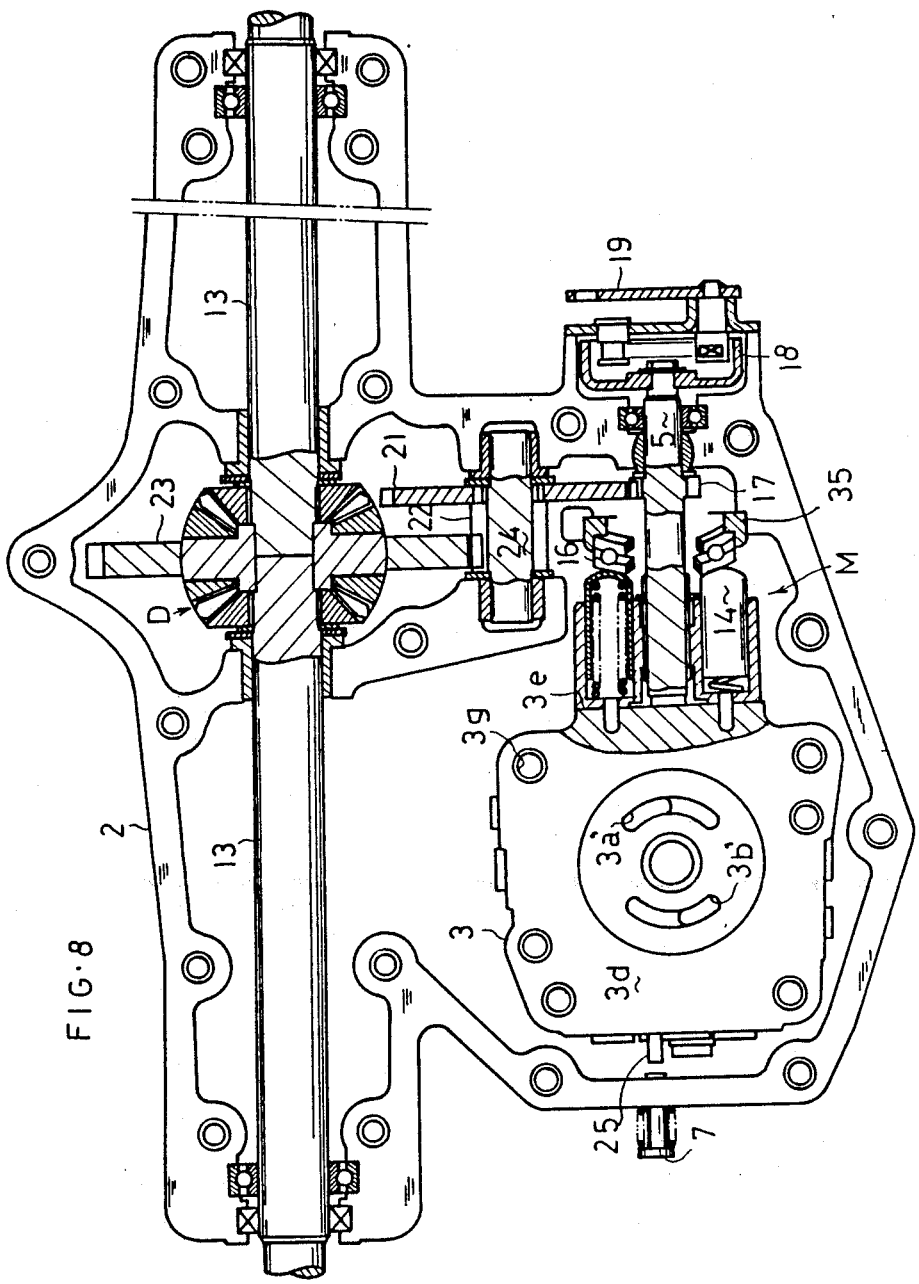
FIG. 8 is a plan view of the FIG. 7 embodiment.
Figure 9:
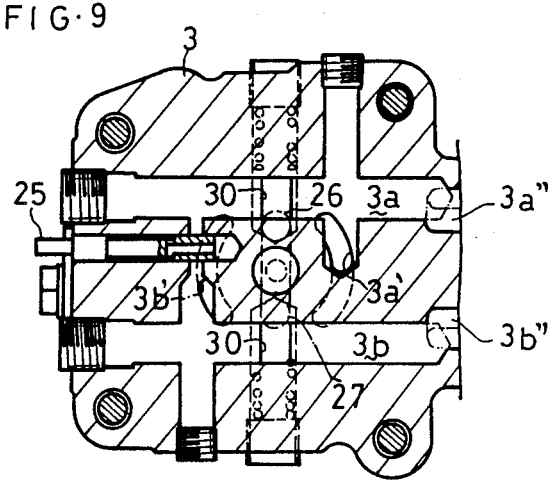
FIG. 9 is a sectional view taken on the line III—III in FIG. 7, showing a center section in FIG. 7.
Figure 10:
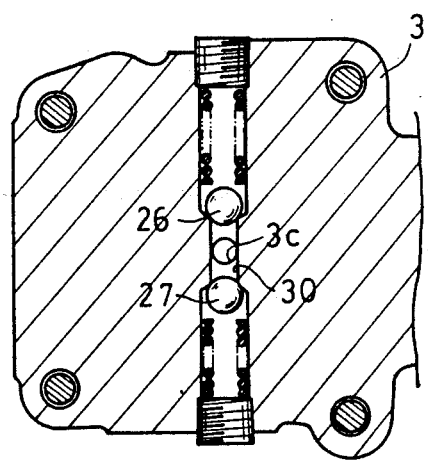
FIG. 10 is a sectional view taken on the line IV—IV in FIG. 7.
Figure 11:
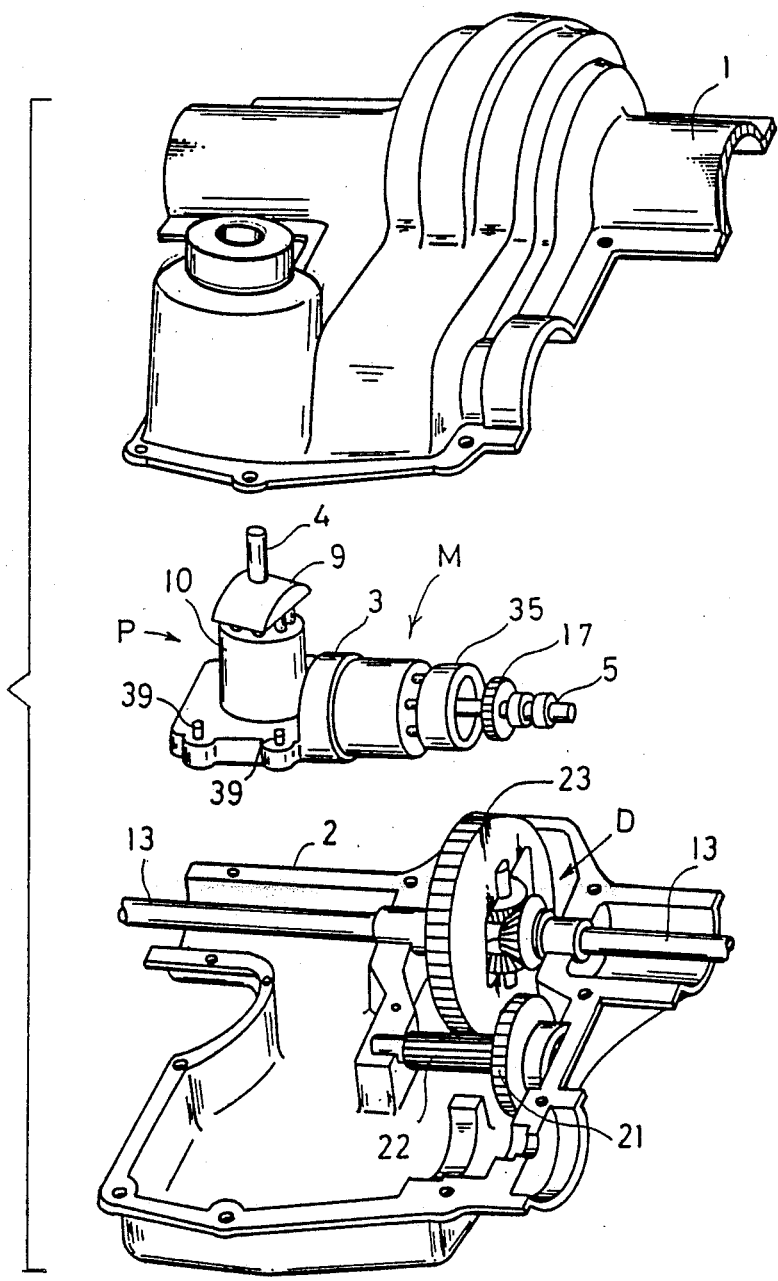
FIG. 11 is a perspective exploded view of the axle driving apparatus of the invention.

In FIG. 6, part of motor mounting surface 3e, against which the motor casing 11 for the hydraulic motor M abuts, is shown.

Referring to FIGS. 7, 8, 9 and 10, a modified embodiment of the axle driving apparatus of the invention will be described.

In the embodiment shown in FIGS. 2 and 3, the oil passages 3a and 3b and supply oil passage 30 are provided at the same plane, but in this case, the motor mounting surface 3e must separate with respect to the pump mounting surface 3d, whereby the center section 3 cannot be compact to that extent and also the casing becomes larger.

Therefore, in the embodiment shown in FIGS. 7 through 10, in order to eliminate the above defects, the supply oil passage 30 is disposed to overlap with the oil passages 3a and 3b in a range of thickness of the lower portion of the center section 3 and below the oil passages 3a and 3b.

The supply oil passage 30 is bored to communicate at the upper half thereof with the lower halves in a manner of overlapping therewith. Hence, the oil passage connecting both the oil passages 30 and 3a, 3b is not required, thereby enabling the center section 3 to be made as smaller as possible in thickness.

At the center of the supply oil passage 30 is open an operating oil suction port 3c toward an oil filter 8 positioned below, and check valves 26 and 27 for opening or closing the communicating portion between the oil passages 3a and 3b are interposed in the supply oil passage 30 in relation of putting the operating oil suction port 3c between the check valves 26 and 27. Supply oil from the operating oil suction port 3c flows to the oil passages 3a and 3b through the portion at the supply oil passage 30 where the supply oil passes the check valves 26 and 27.

Thus, within the center section 3, the oil passages 3a and 3b, supply oil passage 30 and oil filter 8 overlap with each other, whereby the motor mounting surface 3e can approach the pump mounting surface 3d so as to enable the center section 3 to be compact.

The axle driving apparatus of the invention constructed as above-mentioned has the effect as follows:

The axle driving apparatus driven by the engine provided with the vertical crank shaft is provided in the transmission casing the hydraulic pump P and hydraulic motor M to thereby be compact from the viewpoint of the height and width, eliminate the transmission casing largely downwardly from the tractor body, simplify supporting of the motor shaft 5, counter shaft 24 and axles 13, and facilitate assembly of the apparatus.

The pump shaft 4 and motor shaft 5 are supported to the center section 3 through the spherical bearings respectively, so that even when an error is caused to slant the axis of the pump shaft 4 or motor shaft 5 during the assembly of the center section 3 with respect to the upper half case 1, the error can be absorbed.

Since the center section, on which the hydraulic pump is disposed, is fixedly held to the upper half casing, the hydraulic pump and hydraulic motor can simply be mounted by removing the center section and then the same is attached to the upper half casing, thereby simplifying assembly of the apparatus.

The speed change lever 6 for operating the angle changeable swash plate 9 at the hydraulic pump is supported to the upper half casing, the positioning plate 6a is integrally fixed to the speed change lever 6, and the neutral holding mechanism for holding the neutral position of the swash plate by fitting the detent unit 20 into the recess at the positioning plate 6a is housed in the upper half casing 1, thereby eliminating the inconvenience of not ensuring the neutral position due to clogging with dust at part of the positioning plate 6a or the detent unit 20.

The hydraulic motor is of fixed displacement type, the thrust bearing 16 of angle-fixing swash plate is supported by the annular support 35, and the annular support 35 is fixedly sandwiched between the upper half case 1 and the lower half case 2, thereby enabling the thrust bearing 16 of angle-fixing swash plate at the hydraulic motor M to be easily supported.

Although several embodiments have been described, they are merely exemplary of the invention and not to be constructed as limiting, the invention being defined solely by the appended claims.

What is claimed is:

1. An axle driving apparatus characterized in that:
   left and right axles provided at a butt joint therebetween with differential gears, a counter shaft and a motor shaft, are journalled in a transmission casing extending in parallel relationship to each other and longitudinally of said transmission casing;
   first deceleration means is provided between said motor shaft and said counter shaft;
   second deceleration means is provided between said counter shaft and said differential gears;
   said transmission casing is formed of an upper half casing and a lower half casing superposed with each other, and bearings for supporting both axial ends of said axles and counter shaft, and one axial end of said motor shaft, are constituted at said butt joint;
   said motor shaft is supported at the other axial end by the side surface of a center section fixed in said transmission casing so that a hydraulic motor is attached to the side surface of said transmission casing; and
   a hydraulic pump is attached to the upper surface of said center section and a pump shaft of said hydraulic pump is supported at one end to said upper half casing.

2. An axle driving apparatus according to claim 1, characterized in that said pump shaft and motor shaft each use a bearing of the spherical type at an end which is supported to at least said center section.

3. An axle driving apparatus according to claim 1, characterized in that said center section which has said hydraulic pump disposed on the upper surface thereof is fixed to said upper half casing.

4. An axle driving apparatus according to claim 1, characterized in that said hydraulic pump is of a variable displacement type, a speed change lever shaft for controlling a variable angle swash plate is supported to said upper half casing, a positioning plate is integrally fixed to said speed change lever shaft, and a detent unit is fitted into a groove provided at the neutral position of said positioning plate, so as to hold the neutral position of said variable angle swash plate.

5. An axle driving apparatus according to claim 1, characterized in that said hydraulic motor is of a fixed displacement type, a thrust bearing constituting a fixed angle swash plate is held by an annular support, and said annular support being fixedly sandwiched between said upper half casing and lower half casing.

* * * * *

UNITED STATES PATENT AND TRADEMARK OFFICE
CERTIFICATE OF CORRECTION

PATENT NO. : 4,914,907
DATED : April 10, 1990
INVENTOR(S) : Hideaki Okada

It is certified that error appears in the above-identified patent and that said Letters Patent is hereby corrected as shown below:

Column 1, line 11, after "divides" insert --a--; and line 26, delete "system" and insert --systems-- therefor.

Signed and Sealed this

Twentieth Day of August, 1991

Attest:

HARRY F. MANBECK, JR.

Attesting Officer  Commissioner of Patents and Trademarks